US012719142B2

(12) United States Patent
Yang et al.

(10) Patent No.: US 12,719,142 B2
(45) Date of Patent: Aug. 25, 2026

(54) WIDEBAND TEM TO TM01 MODE CONVERTER FOR MICROWAVE PLASMA SYSTEMS

(71) Applicant: Applied Materials, Inc., Santa Clara, CA (US)

(72) Inventors: Xiaokang Yang, Fremont, CA (US); Tza-Jing Gung, San Jose, CA (US); John C. Forster, Mountain View, CA (US); Sanjeev Baluja, Campbell, CA (US)

(73) Assignee: Applied Materials, Inc., Santa Clara, CA (US)

( * ) Notice: Subject to any disclaimer, the term of this patent is extended or adjusted under 35 U.S.C. 154(b) by 114 days.

(21) Appl. No.: 18/765,252

(22) Filed: Jul. 6, 2024

(65) Prior Publication Data

US 2026/0011900 A1 Jan. 8, 2026

(51) Int. Cl.

| | |
|---|---|
| ***H01P 7/06*** | (2006.01) |
| ***H01P 1/208*** | (2006.01) |
| ***H01P 1/213*** | (2006.01) |
| ***H01P 7/04*** | (2006.01) |

(52) U.S. Cl.

CPC .......... *H01P 1/2084* (2013.01); *H01P 1/2086* (2013.01); *H01P 1/2088* (2013.01); *H01P 1/2138* (2013.01); *H01P 7/04* (2013.01); *H01P 7/06* (2013.01)

(58) Field of Classification Search

CPC .. H01P 7/06; H01P 7/04; H01P 1/2084; H01P 1/2086

USPC ........ 333/206, 207, 208, 209, 222–227, 231

See application file for complete search history.

(56) References Cited

U.S. PATENT DOCUMENTS

| | | | | |
|---|---|---|---|---|
| 5,748,060 | A * | 5/1998 | Sarkka ...................... | H01P 7/10 333/219.1 |
| 2016/0126066 | A1* | 5/2016 | Yoshikawa ....... | H01J 37/32816 156/345.33 |
| 2020/0161093 | A1 | 5/2020 | Li et al. | |
| 2020/0365371 | A1 | 11/2020 | Mori et al. | |
| 2022/0199364 | A1 | 6/2022 | Lee et al. | |
| 2024/0153795 | A1 | 5/2024 | Fischbach et al. | |

FOREIGN PATENT DOCUMENTS

| | | | |
|---|---|---|---|
| WO | 2021152655 | A1 | 8/2021 |

OTHER PUBLICATIONS

International Search Report and Written Opinion from PCT/US2025/035449 dated Nov. 10, 2025, 9 pgs.

* cited by examiner

*Primary Examiner* — Rakesh B Patel

(74) *Attorney, Agent, or Firm* — Schwabe, Williamson & Wyatt, P.C.

(57) ABSTRACT

Embodiments described herein relate to an apparatus that includes a dielectric puck with a height between a first surface and a second surface. In an embodiment, the apparatus further includes a pin that is inserted into a hole into the first surface of the dielectric puck, where the pin is electrically conductive. In an embodiment, the pin includes a first portion with a first width, and a second portion with a second width. In an embodiment, the second width is greater than the first width.

22 Claims, 7 Drawing Sheets

WIDEBAND TEM TO TM01 MODE CONVERTER FOR MICROWAVE PLASMA SYSTEMS

BACKGROUND

1) Field

Embodiments of the present disclosure pertain to the field of microwave plasma systems with microwave DRAs that works as a mode convertor between a coaxial waveguide and a circular waveguide to convert the transverse electromagnetic (TEM) mode into TM01 mode with a higher mode conversion coefficient over a wideband of microwave frequency.

2) Description of Related Art

In microwave-based plasma processing chambers microwave radiation is coupled into the chamber in order to ignite and/or sustain the plasma. Traditionally, magnetron based microwave sources were used in order to generate the microwave radiation that is coupled into the chamber. However, solid state microwave power amplifiers have become a feasible option in recent years. Solid state microwave power amplifiers are more compact than magnetron solutions. As such, a plurality of microwave DRAs can be distributed across a dielectric lid of the chamber. Each channel of existing microwave plasma sources comprises a solid state power amplifier, a coaxial cable, conical impedance transformer (CIT), and a dielectric resonator antenna (DRA). The mode conversion occurs in the area inside the dielectric puck between coaxial waveguide and circular waveguide. Specifically, the conversion occurs in the region below the electrically conductive pin and above the dielectric plate. The TM01 is a desired mode in microwave plasma sources due to its axisymmetric magnetic field profile and a strong electric filed along the axial direction propagating vertically towards a wafer surface. As such, TM01 mode is beneficial for plasma ignition and plasma uniformity. While referred to herein as a "DRA", it is to be appreciated that the DRA may also be referred to more generically as a waveguide (e.g., including a coaxial waveguide section and a circular waveguide section) filled with dielectric material (ceramic). In some embodiments, the DRA may be referred to as a cavity, especially when it is filled with air and there is a plasma below the ceramic faceplate.

However, existing microwave DRA designs may not be fully optimized to achieve the desired TM01 mode with a highest mode purity over a wide frequency bandwidth. For example, the mode conversion region is too short (e.g., less than 3 mm), and the TEM-to-TM01 mode conversion may not fully complete before microwave power radiates into plasma chamber. In this case, some of the unwanted lower order modes of a circular waveguide, such as TE11, or TE21, or TM11, or TE02, may co-exist and propagate into plasma chamber. In addition, the pin that works as a coupling antenna is inserted into the axial center of the dielectric puck at the axis. Accordingly, the microwave DRAs can operate only within a narrow frequency bandwidth of impedance matching.

SUMMARY

Embodiments described herein relate to an apparatus that includes a dielectric puck with a height between a first surface and a second surface. In an embodiment, the apparatus further includes a pin that is inserted into a hole into the first surface of the dielectric puck, where the pin is electrically conductive. In an embodiment, the pin includes a first portion with a first width, and a second portion with a second width. In an embodiment, the second width is greater than the first width.

Embodiments described herein relate to an apparatus that includes a plate that is a first dielectric material, and a puck over the plate, where the puck includes a second dielectric material. In an embodiment, a hole is formed into the puck, where the hole has a first width at a surface of the puck and a second width within the puck. In an embodiment, the second width is greater than the first width. In an embodiment, the apparatus further includes a pin inserted into the hole, where a pin depth is less than half of a height of the puck.

Embodiments described herein relate to an apparatus that includes a chamber with a lid that includes a first dielectric material. In an embodiment, the apparatus further includes a puck on the lid, where the puck includes a second dielectric material. In an embodiment, a conductive layer is provided around the puck, and a pin is inserted into a hole in the puck. In an embodiment, the hole has a first width at a surface of the puck and the pin has an end with a second width that is greater than the first width.

DETAILED DESCRIPTION

Figure 1:
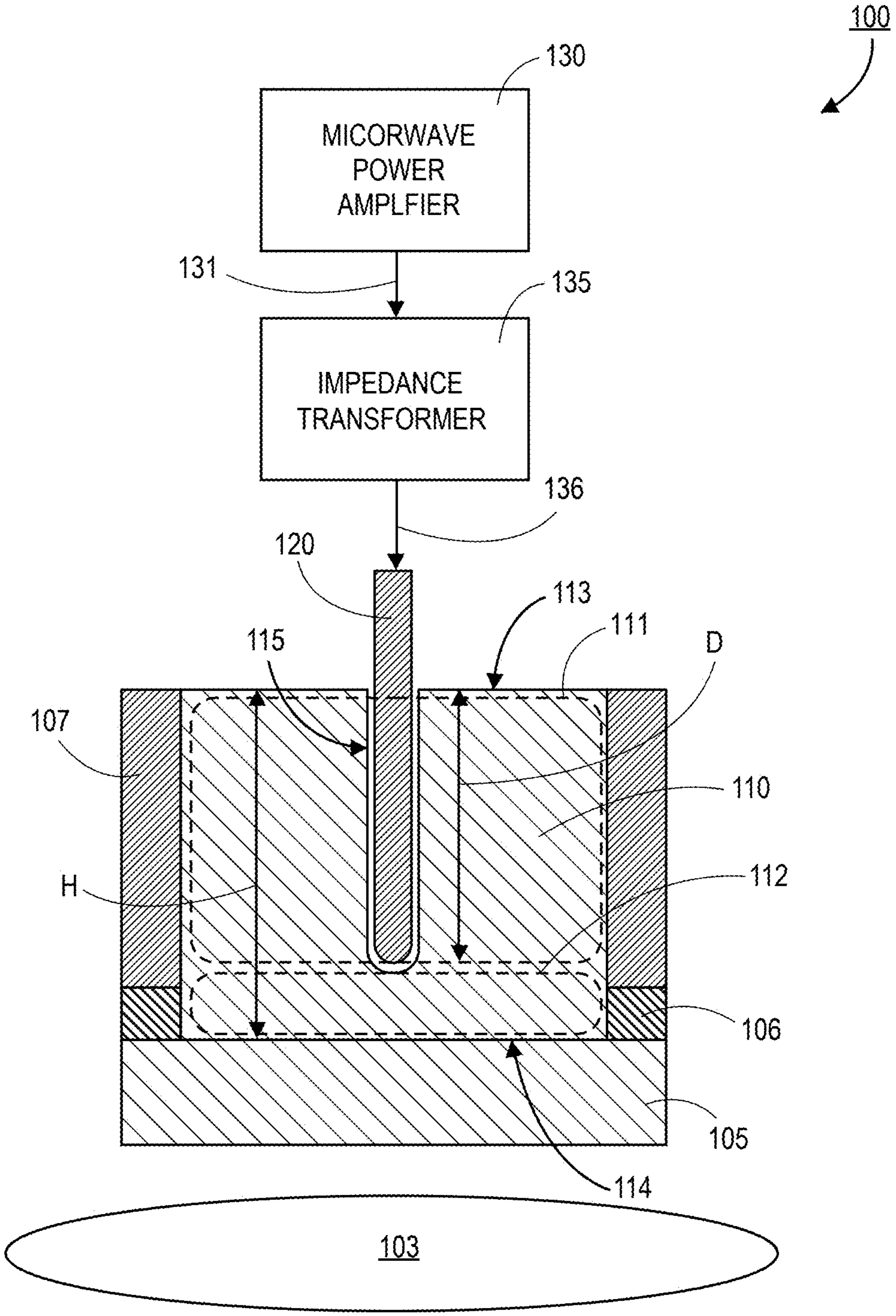
FIG. 1 is a cross-sectional schematic illustration of a portion of a microwave dielectric resonator antenna (DRA) that comprises a dielectric puck with a linear pin that is inserted into the dielectric puck, in accordance with an embodiment.

Microwave plasma systems with microwave DRAs for coupling wideband microwave power with a high TM01 mode percentage into a plasma chamber are disclosed herein, in accordance with various embodiments. In the following description, numerous specific details are set forth in order to provide a thorough understanding of embodiments. It will be apparent to one skilled in the art that embodiments may be practiced without these specific details. In other instances, well-known aspects are not described in detail in order to not unnecessarily obscure embodiments. Furthermore, it is to be understood that the various embodiments shown in the accompanying drawings are illustrative representations and are not necessarily drawn to scale.

Various embodiments or aspects of the disclosure are described herein. In some implementations, the different embodiments are practiced separately. However, embodiments are not limited to embodiments being practiced in isolation. For example, two or more different embodiments can be combined together in order to be practiced as a single device, process, structure, or the like. The entirety of various embodiments can be combined together in some instances. In other instances, portions of a first embodiment can be combined with portions of one or more different embodiments. For example, a portion of a first embodiment can be combined with a portion of a second embodiment, or a portion of a first embodiment can be combined with a portion of a second embodiment and a portion of a third embodiment.

The embodiments illustrated and discussed in relation to the figures included herein are provided for the purpose of explaining some of the basic principles of the disclosure. However, the scope of this disclosure covers all related, potential, and/or possible, embodiments, even those differing from the idealized and/or illustrative examples presented. This disclosure covers even those embodiments which incorporate and/or utilize modern, future, and/or as of the time of this writing unknown, components, devices, systems, etc., as replacements for the functionally equivalent, analogous, and/or similar, components, devices, systems, etc., used in the embodiments illustrated and/or discussed herein for the purpose of explanation, illustration, and example.

As noted above, existing microwave DRAs for microwave plasma processing tools exhibit a conversion from transverse electromagnetic (TEM) mode to transverse magnetic (TM) mode (e.g., TM01 mode) that is unpredictable. This can be detrimental to the microwave power coupling efficiency within the chamber. TM01 is the desired circular waveguide mode for microwave plasma processing reactors, because it not only has an axis-symmetric magnetic field but also has a strong electric field which propagates in axial direction and perpendicularly towards a wafer surface, this is beneficial for plasma ignition. While for the TEM mode in coaxial waveguide (or coaxial cable), both its magnetic field and electric field are perpendicular to microwave propagation direction (axial direction) and in parallel with the wafer surface. The TEM mode propagates in a coaxial waveguide region of the microwave DRA. That is, the region around the pin inserted into the dielectric puck will typically propagate primarily in the TEM mode. The region between the end of the pin and the bottom of the dielectric puck will operate as a mode conversion region, where the TEM mode converts into the TM01 mode. The mode conversion region may generally be considered as being a circular waveguide region. In existing microwave DRAs, the mode conversion region is too small, and there is not enough distance to fully convert the microwave power to the TM01 mode, and the TEM mode will not propagate in the circular waveguide region. When the TEM-to-TM01 mode conversion is not fully completed before microwave power radiates into plasma chamber, some of the unwanted lower order modes of a circular waveguide, such as TE11, or TE21, or TM11, or TE02, may co-exist and propagate into plasma chamber. For example, TE11 mode has lower cut off frequency than TM01 mode. If the mode conversion region is too short, the TE11 mode might be easily excited thus TEM-to-TM01 mode conversion efficiency would be reduced. Additionally, existing microwave DRAs suffer from poor frequency bandwidth of plasma impedance. As such, plasma impedance matching may not be achievable over the full operation frequency range (e.g., 2.4 GHz to 2.5 GHz).

Accordingly, embodiments disclosed herein include microwave DRAs that are configured to increase the length of the mode conversion region and provide a more predictable conversion from the TEM mode to the TM01 mode. As such, a higher percentage of TM01 mode microwave power can be coupled into the chamber, and the percentage of TM01 mode microwave power is more predictable. Increasing the TM01 mode purity is desired in microwave plasma sources due to the generation of an axisymmetric magnetic field profile and a strong electric filed along the axial direction propagating vertically towards a wafer surface. As such, TM01 mode is beneficial for plasma ignition and plasma uniformity. Furthermore, embodiments disclosed herein may include microwave DRAs with pins that are designed to provide a broader frequency bandwidth in order to more fully cover the operational frequency range of the system with small reflected power.

In an embodiment, the length of the mode conversion region of the microwave DRAs may be increased by modifying a position of the pin within the dielectric puck. For example, a pin depth may be up to approximately one half of the height of the dielectric puck or up to approximately one quarter of the height of the dielectric puck. This allows for an extension of the circular waveguide region of the microwave DRA. In other embodiments, the shape of the pin can be modified to improve the frequency bandwidth of impedance matching. For example, the end of the pin may be tapered, stepped, and/or the like. The cross-section of the dielectric puck may also be modified in order to change a distance between the outer conductor and the pin in some embodiments. More generally, components within the microwave DRA may be optimized to provide a desired pin depth, length of the circular waveguide region, a profile shape and/or dimension of an end of the pin, a distance between the pin and the outer conductor, and/or the like.

Referring now to FIG. 1, a cross-sectional illustration of a portion of a microwave DRA 100 is shown, in accordance with an embodiment. In an embodiment, the microwave DRA 100 may comprise a dielectric puck 110. The dielectric puck 110 may be a substantially cylindrical structure that is provided over a plate 105. The plate 105 may also be a dielectric material. In an embodiment the plate 105 may be a lid for a plasma chamber (not shown). For example, a plasma 103 may be generated below the plate 105 within the plasma chamber.

In an embodiment, the dielectric puck 110 may comprise a hole 115 that is formed into a top surface 113 of the dielectric puck 110. The hole 115 may extend partially through a height H of the dielectric puck 110. That is, the hole 115 does not extend through the dielectric puck 110 to the bottom surface 114 of the dielectric puck 110. In an embodiment, the hole 115 is at a center of the dielectric puck 110. A pin 120 may be inserted into the hole 115. The pin

120 may be an electrically conductive material, such as copper or the like. In an embodiment, the pin 120 may have a pin depth D into the dielectric puck 110. The pin depth D may be any suitable distance. Commonly, the pin depth D may be approximately half of the height H or more.

In an embodiment, the pin 120 may function as the antenna that couples microwave power into the chamber in order to ignite and/or sustain the plasma 103. For example, the pin 120 may be electrically coupled to a conical impedance transformer (CIT) 135 and a microwave power amplifier 130. For example, a first coaxial cable 131 may couple the microwave power amplifier to the CIT 135, and a second coaxial cable 136 may couple the CIT 135 to the pin 120. In an embodiment, the microwave power amplifier 130 may produce microwave power with a frequency between approximately 2.4 GHz and approximately 2.5 GHz.

As can be appreciated, the pin depth D may be at least partially responsible for the conversion of TEM mode propagation into TM01 mode propagation. For example, the dielectric puck 110 may be surrounded by an outer conductor 107. The outer conductor 107 may be spaced away from the plate 105 by a rubber O-ring 106 or the like. In such an embodiment, the combination of the pin 120, the dielectric puck 110, and the outer conductor 107 forms a coaxial structure. The coaxial structure enables propagation of the microwave power in the TEM mode. As indicated by the dashed box, the coaxial waveguide region 111 is provided in the upper portion of the dielectric puck 110 to a depth substantially equal to the pin depth D.

The lower portion of the dielectric puck 110 forms a circular waveguide region 112 (which may also be referred to as the conversion region). In an embodiment, the circular waveguide region 112 induces a conversion of the TEM mode into the TM01 mode. However, since the circular waveguide region 112 is relative short in FIG. 1, the conversion of the microwave power to TM01 mode propagation is unpredictable and does not reach desired TM01 mode percentages. As such, the resulting electric field and magnetic field within the chamber are not optimized for efficient plasma generation.

Further the shape of the pin 120 does not enable broadband frequency propagation into the chamber. For example, the pin 120 may have a substantially constant diameter through a length of the pin 120. As such, a narrow band response is generated by the pin 120. This results in a high reflected power at some operating frequencies of the system. Thus, certain applications of the microwave plasma chamber may be limited.

Accordingly, embodiments disclosed herein include optimized microwave DRAs that allow for improved TM01 mode conversion and a broadband frequency emission with low reflected power. The improved TM01 mode conversion may be provided by decreasing the pin depth D. Decreasing the pin depth D may generally reduce the length of the coaxial waveguide region while increasing the length of the circular waveguide region. The longer circular waveguide region allows for a more complete and predictable conversion of the TEM mode into the TM01 mode. As such, the magnetic field profile and electric filed along the axial direction propagating vertically towards a wafer surface are optimized. This allows for more efficient generation of the plasma within the chamber.

Additionally, embodiments disclosed herein may include a pin with an end region that is modified to emit microwave power over a broadband microwave frequency with low reflected power. For example, the end of the pin may have a diameter that is greater than the diameter of the main portion of the pin. The end may be conical, supershaped, or any other antenna design suitable for wideband or ultra-wideband operation.

Referring now to FIGS. 2A-2D, a series of cross-sectional illustrations depicting different microwave DRAs 200 is shown, in accordance with an embodiment. The microwave DRAs 200 in FIGS. 2A-2D may be configured to provide longer circular waveguide regions 212 (e.g., approximately 3 mm or longer) while also improving the broadband microwave propagation from the pin 220. Accordingly, the microwave DRAs 200 may enable stronger electric fields along the axial direction propagating vertically towards a wafer surface within the chamber while also utilizing a larger portion of the operating frequency of the plasma processing tool.

Figure 2A:
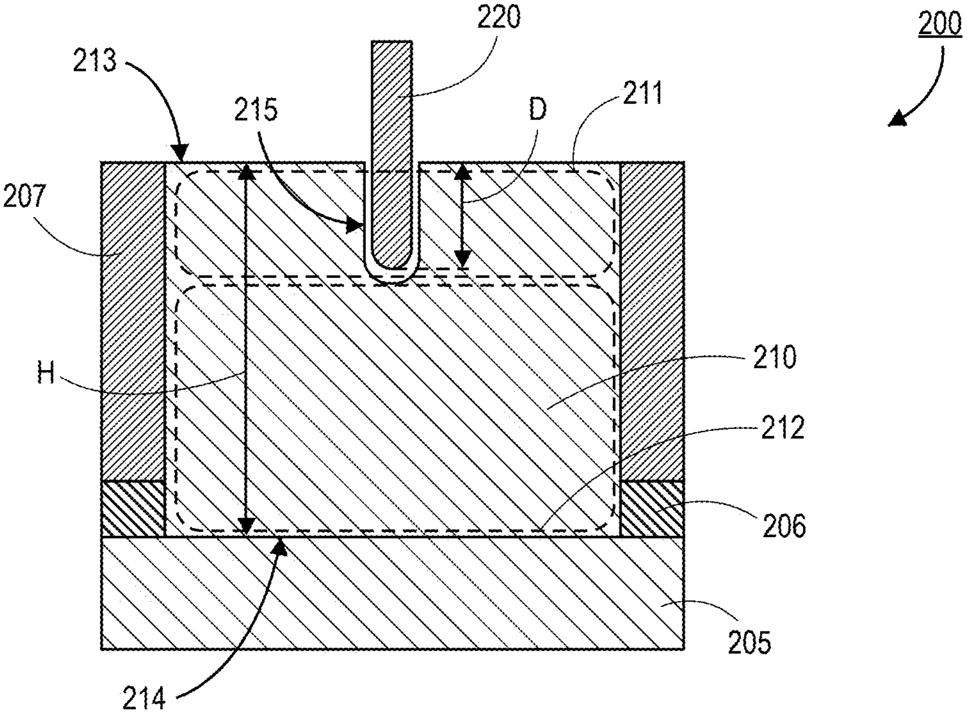
FIG. 2A is a cross-sectional illustration of a portion of a microwave DRA that comprises an optimized dielectric puck with an extended mode conversion region, in accordance with an embodiment.

Referring now to FIG. 2A, a cross-sectional illustration of a portion of a microwave DRA 200 is shown, in accordance with an embodiment. In an embodiment, the microwave DRA 200 may comprise a dielectric puck 210 with a top surface 213 and a bottom surface 214. The bottom surface 214 may be supported by a dielectric plate 205. The dielectric plate 205 may be part of a lid for a chamber (not shown). In an embodiment, a hole 215 may be provided into the top surface 213 at an axial center of the dielectric puck 210. The hole 215 may have substantially vertical sidewalls in some embodiments.

In an embodiment, a pin 220 may be inserted into the hole 215. The pin 220 may have a pin depth D that is smaller than the height H of the dielectric puck 210. In an embodiment, the pin depth D may be up to approximately one half of the height H of the dielectric puck 210, or the pin depth D may be up to approximately one quarter of the height H of the dielectric puck 210. Stated differently, a depth of the hole 215 may be up to approximately half of the height H of the dielectric puck 210, or the depth of the hole 215 may be up to approximately half of the height H of the dielectric puck 210. In an embodiment, the dielectric puck 210 may be surrounded by an outer conductor 207. The outer conductor 207 may be separated from the dielectric plate 205 by a rubber O-ring 206 or the like. The portion of the dielectric puck 210 that overlaps the pin 220 may be referred to as the coaxial waveguide region 211.

In an embodiment, the shorter pin depth D provides a coaxial waveguide region 211 that is smaller than existing microwave DRA solutions. The reduction in the length of the coaxial waveguide region 211 results in a corresponding increase to the length of the circular waveguide region 212. That is, the length of the circular waveguide region 212 equals the puck height H minus the pin depth D. For example, a length (i.e., measured in the vertical axis that is orthogonal to the top surface 213) of the circular waveguide region 212 may be equal to or greater than a length of the coaxial waveguide region 211. In some embodiments, a length of the circular waveguide region 212 may be approximately 3 mm or longer. The increased length of the circular waveguide region 212 allows for a more predictable conversion of TEM mode propagation into TM01 mode propagation. Further, a total percentage of the microwave power that is propagated in the TM01 mode is relatively high (e.g., 75% or more, 90% or more, or 99% or more). Accordingly, the strength of the electric field generated within the chamber (i.e., below the dielectric plate 205 in FIG. 2A) is higher than existing solutions. As such, igniting and/or sustaining the plasma is more efficient than existing solutions.

Figure 2B:
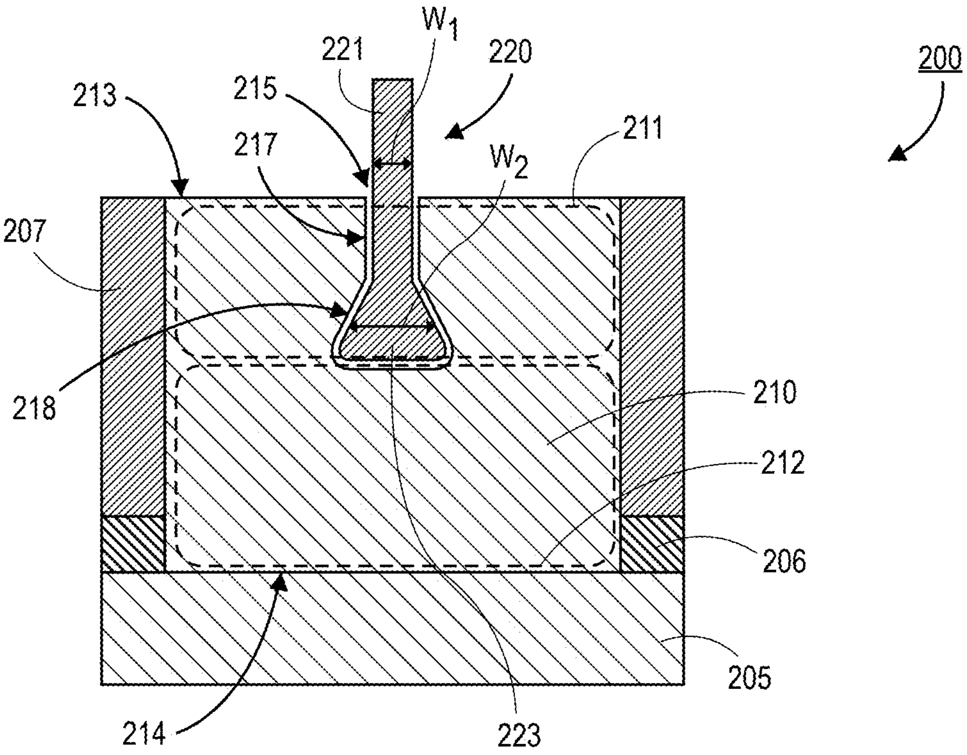
FIG. 2B is a cross-sectional illustration of a portion of a microwave DRA that comprises a dielectric puck with an extended mode conversion region and a pin with an end that has a mono-cone shape, in accordance with an embodiment.

Referring now to FIG. 2B, a cross-sectional illustration of a portion of a microwave DRA 200 is shown, in accordance with an additional embodiment. In an embodiment, the microwave DRA 200 in FIG. 2B may be similar to the microwave DRA 200 in FIG. 2A, with the exception of the pin 220 and the hole 215 in the dielectric puck 210. For example, the pin 220 may comprise a first portion 221 and a second portion 222. The first portion 221 may have a first width $W_1$ and the second portion 222 may have a second width $W_2$ that is larger than the first width $W_1$. More generally, the first portion 221 may comprise a substantially uniform width $W_1$ along the length of the first portion 221, and the second portion 222 may comprise a non-uniform second width $W_2$ along the length of the second portion 222. For example, the second portion 222 may have sidewalls that are tapered. In a three dimensional view, the second portion 222 may be conical or frustoconical. In some instances, the shape of the end of the pine 220 may be considered as being a mono-cone. The conical shape of the second portion 222 may result in a broadband propagation of the microwave power. As such, the total operating frequency range of the plasma tool may be more fully used. Additionally, the shape of the second portion 222 may be used to match the input impedance of the microwave DRA 200 to a plasma impedance.

In an embodiment, the hole 215 may also include a non-uniform diameter to conform to the shape of the pin 220. For example, the hole 215 may have a first portion with a substantially vertical sidewall 217 and a second portion with a tapered sidewall 218. In the illustrated embodiment, the sidewalls 217 and 218 are spaced away from the pin 220. Though, in other embodiments, one or both sidewalls 217 or 218 may contact the pin 220 at one or more locations. Additionally, it is to be appreciated that the second portion 222 is wider than the opening of the hole 215 at the top surface 213 of the dielectric puck 210. As such, the pin 220 may not be inserted into the hole 215 since the second portion 222 may not fit through the opening of the hole 215. Accordingly, the dielectric puck 210 may be segmented, and the segmented portions are coupled to each other around the pin 220. A more detailed example of such a segmentation is provided in greater detail below.

Figure 2C:
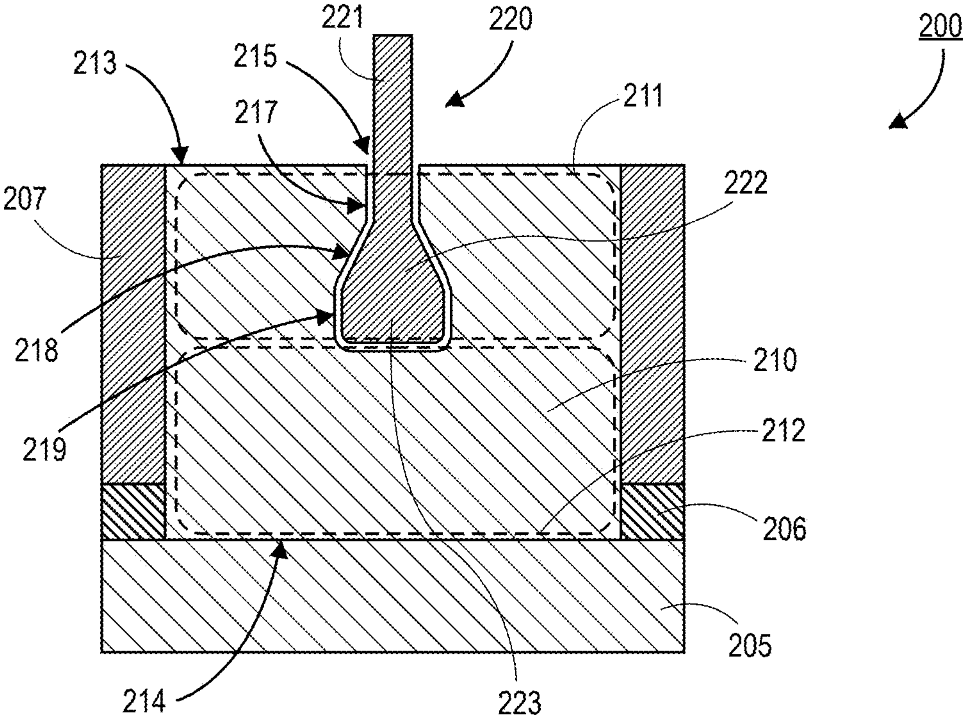
FIG. 2C is a cross-sectional illustration of a portion of a microwave DRA that comprises a dielectric puck with an extended mode conversion region and a pin that has a shirt-cone shape, in accordance with an embodiment.

Referring now to FIG. 2C, a cross-sectional illustration of a portion of a microwave DRA 200 is shown, in accordance with an additional embodiment. In an embodiment, the microwave DRA 200 in FIG. 2C may be similar to the microwave DRA 200 in FIG. 2B, with the exception of the shape of the pin 220. Instead of a conical end, the pin 220 may have an end that comprises a second portion 222 and a third portion 223. In an embodiment, the second portion 222 may comprise a conical shape with tapered sidewalls, and the third portion 223 may comprise a cylindrical shape with vertical sidewalls. In such an embodiment, the second portion 222 may transition a first diameter of the first portion to a second diameter of the third portion. In some embodiments, such a shape for the end of the pin 220 may be referred to as being a shirt-cone shape. The use of a pin 220 with such an end profile may be beneficial for providing wideband microwave power propagation into the chamber. Additionally, the shape of the second portion 222 and the third portion 223 may be used to match the input impedance of the microwave DRA 200 to a plasma impedance.

In an embodiment, the hole 215 may also be modified to accommodate the shape of the end of the pin 220. For example, the hole 215 may comprise a vertical first sidewall 217 adjacent to the first portion 221 of the pin 220, a tapered second sidewall 218 adjacent to the second portion 222 of the pin 220, and a vertical third sidewall 219 adjacent to the third portion 223 of the pin 220. In the illustrated embodiment, the sidewalls 217, 218, and 219 are spaced away from the pin 220. Though, in other embodiments, one or more of the sidewalls 217, 218, and 219 may contact the pin 220 at one or more locations. In some embodiments, the dielectric puck 210 may be segmented, so that the dielectric puck 210 may be wrapped around the pin 220 since the second portion 222 and the third portion 223 may be wider than an opening of the hole 215 at the top surface 213 of the dielectric puck 210.

Figure 2D:
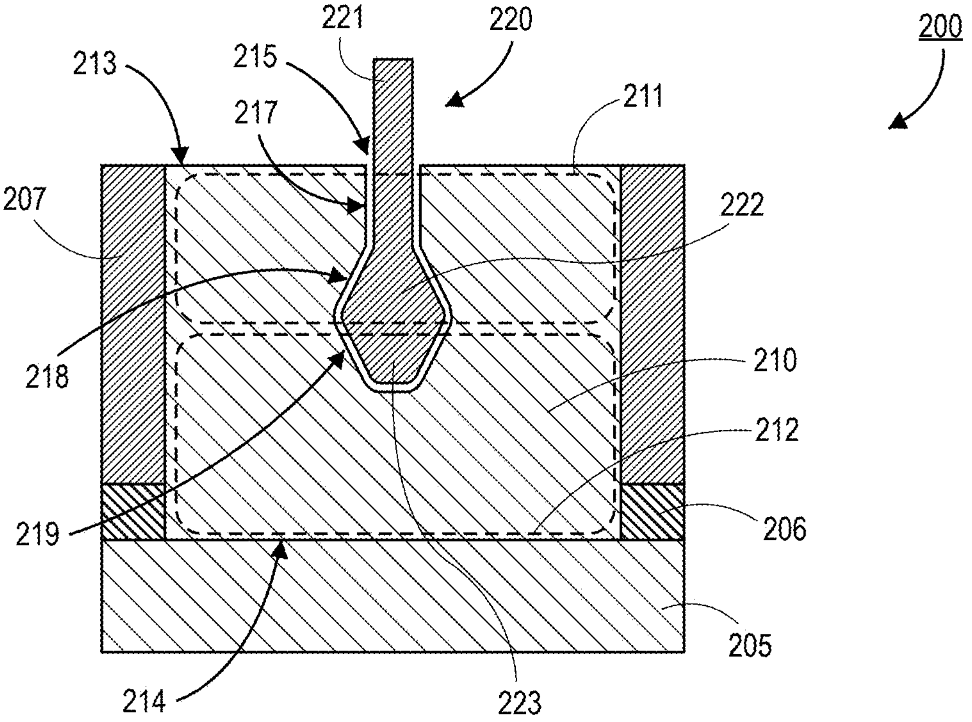
FIG. 2D is a cross-sectional illustration of a portion of a microwave DRA that comprises a dielectric puck and a pine with an end that includes an inverted-cone shape, in accordance with an embodiment.

Referring now to FIG. 2D, a cross-sectional illustration of a portion of a microwave DRA 200 is shown, in accordance with an additional embodiment. In an embodiment, the microwave DRA 200 in FIG. 2D may be similar to the microwave DRA 200 in FIG. 2B, with the exception of the shape of the pin 220. Instead of a conical end, the pin 220 may have an end that comprises a second portion 222 and a third portion 223. In an embodiment, the second portion 222 may comprise a conical shape with tapered sidewalls, and the third portion 223 may comprise a conical shape with tapered sidewalls. The second portion 222 may have an increasing diameter along a direction towards an end of the pin 220, and the third portion 223 may have a decreasing diameter along the direction towards the end of the pin 220. The combination of the second portion 222 and the third portion 223 may resemble a symmetric irregular hexagon. In some embodiments, such a shape for the end of the pin 220 may be referred to as being an inverted-cone shape. The use of a pin 220 with such an end profile may be beneficial for providing wideband microwave power propagation into the chamber. Additionally, the shape of the second portion 222 and the third portion 223 may be used to match an input impedance of the microwave DRA 200 to a plasma impedance.

In an embodiment, the hole 215 may also be modified to accommodate the shape of the end of the pin 220. For example, the hole 215 may comprise a vertical first sidewall 217 adjacent to the first portion 221 of the pin 220, a tapered second sidewall 218 adjacent to the second portion 222 of the pin 220, and a tapered third sidewall 219 adjacent to the third portion 223 of the pin 220. In the illustrated embodiment, the sidewalls 217, 218, and 219 are spaced away from the pin 220. Though, in other embodiments, one or more of the sidewalls 217, 218, and 219 may contact the pin 220 at one or more locations. In some embodiments, the dielectric puck 210 may be segmented, so that the dielectric puck 210 may be wrapped around the pin 220 since the second portion 222 and the third portion 223 may be wider than an opening of the hole 215 at the top surface 213 of the dielectric puck 210.

Figure 3A:
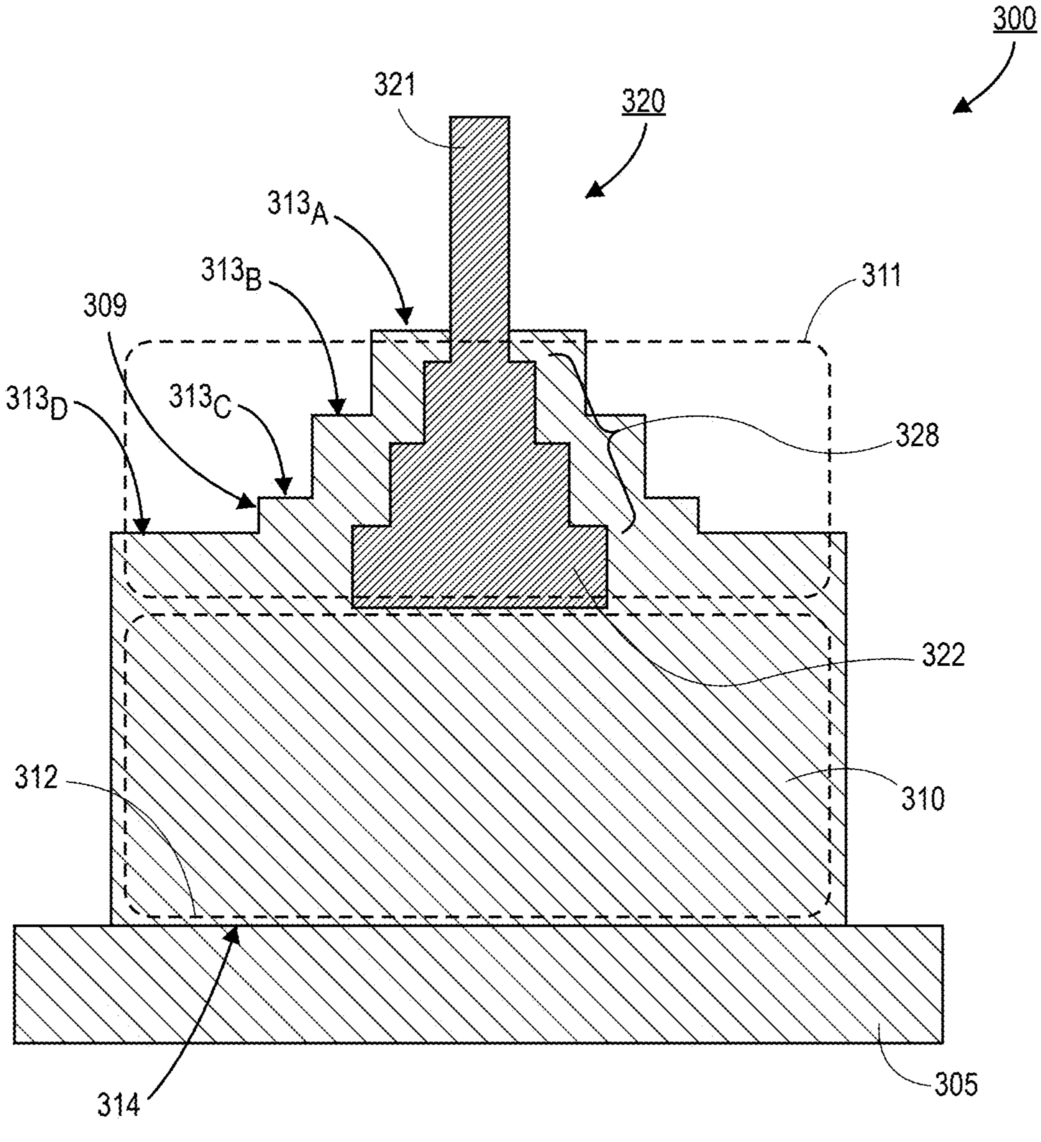
FIG. 3A is a cross-sectional illustration of a portion of a microwave DRA that comprises a dielectric puck with a stepped top surface and a pin with an end with a stepped profile, in accordance with an embodiment.
Figure 3B:
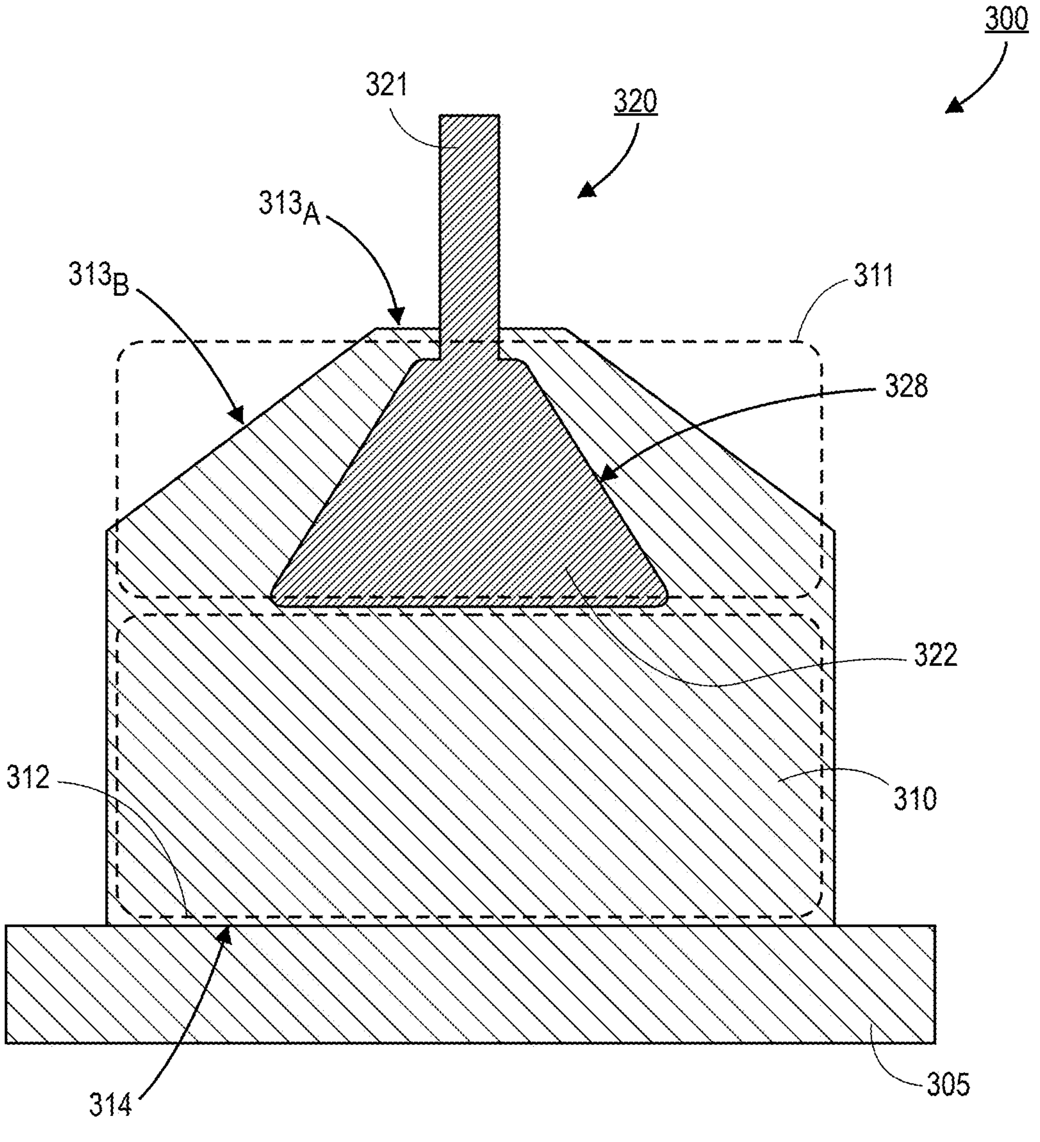
FIG. 3B is a cross-sectional illustration of a portion of a microwave DRA that comprises a dielectric puck with a sloped top surface and a pin with a tapered end, in accordance with an embodiment.

Referring now to FIGS. 3A-3B, a series of cross-sectional illustrations depicting a portion of a microwave DRA 300 is shown, in accordance with various embodiments. In the embodiments shown in FIGS. 3A-3B, the microwave DRAs 300 comprises pins 320 with ends that are configured for wideband propagation of microwave power. Additionally, the dielectric pucks 310 may have top surfaces that are non-horizontal. That is, the entirety of the top surfaces 313 may not be parallel to the bottom surface 314 in some embodiments. Altering the profile of the top surface 313 allows for changes to the distance between the pin 320 and an outer conductor (not shown) that wraps around the dielectric puck 310.

Referring now to FIG. 3A, a cross-sectional illustration of a portion of a microwave DRA 300 is shown, in accordance with an embodiment. In an embodiment, the microwave DRA 300 may comprise a dielectric puck 310 with a top surface 313 and a bottom surface 314. The bottom surface 314 may be supported by a dielectric plate 305. The dielectric plate 305 may be part of a lid for a chamber (not shown). In an embodiment, the top surface 313 may comprise a stepped profile. For example, steps $313_A$-$313_D$ may be provided along the top surface. The steps $313_A$-$313_D$ may be coupled together by risers 309. Accordingly, the entire top surface 313 is non-horizontal, and the top surface 313 may include one or more portions that are not parallel to the bottom surface 314. The stepped top surface 313 allows for an outer conductor (not shown) that surrounds the dielectric puck 310 to have a non-uniform spacing from the pin 320.

In an embodiment, a pin 320 may be inserted into dielectric puck 310. The pin 320 may have a pin depth that is smaller than the height of the dielectric puck 310. In an embodiment, the pin depth may be up to approximately one half of the height of the dielectric puck 310, or the pin depth may be up to approximately one quarter of the height of the dielectric puck 310. In an embodiment, the portion of the dielectric puck 310 that overlaps the pin 320 may be referred to as the coaxial waveguide region 311.

In an embodiment, the shorter pin depth provides a coaxial waveguide region 311 that is smaller than existing microwave DRA solutions. The reduction in the length of the coaxial waveguide region 311 results in a corresponding increase to the length of the circular waveguide region 312. For example, a length (i.e., measured in the vertical axis that is orthogonal to the top surface 313) of the circular waveguide region 312 may be equal to or greater than a length of the coaxial waveguide region 311. The increased length of the circular waveguide region 312 allows for a more predictable conversion of TEM mode propagation into TM01 mode propagation. Further, a total percentage of the microwave power that is propagated in the TM01 mode is relatively high (e.g., 75% or more, 90% or more, or 99% or more). Accordingly, the strength of the electric field generated within the chamber (i.e., below the dielectric plate 305 in FIG. 3A) is higher than existing solutions. As such, igniting and/or sustaining the plasma is more efficient than existing solutions.

In an embodiment, the pin 320 may comprise a first portion 321 and a second portion 322. The first portion 321 may have a first a constant width and the second portion 322 may have a non-uniform width. The second portion 322 may have a stepped cross-sectional shape. For example, a sidewall 328 of the second portion may have a plurality of steps. In an embodiment, the shape of the second portion 322 may result in wideband propagation of the microwave power. As such, the total operating frequency range of the plasma tool may be more fully used. Additionally, the shape of the second portion 322 may be used to match an input impedance of the microwave DRA 300 to a plasma impedance.

Referring now to FIG. 3B, a cross-sectional illustration of a portion of a microwave DRA 300 is shown, in accordance with an additional embodiment. In an embodiment, the microwave DRA 300 in FIG. 3B is similar to the microwave DRA in FIG. 3A, with the exception of the top surface 313 of the dielectric puck and the sidewall 328 of the pin 320. Instead of a stepped surface, the top surface 313 has a horizontal surface $313_A$ and a tapered surface $313_B$. The tapered surface $313_B$ may not be parallel with the bottom surface 314. Similarly, the pin 320 has a second portion 322 with a tapered sidewall 328. The second portion 322 may be conical in some embodiments. In the illustrated embodiment, the slope of the tapered surface $313_B$ may be different than the slope of the sidewall 328 of the pin 320. Though, in other embodiments, the slope of the tapered surface $313_B$ may be substantially equal to a slope of the sidewall 328 of the pin 320.

In the embodiments described in greater detail herein, the puck 310 is shown as a substantially solid dielectric material, with the exception of the hole 315 to accommodate the pin 320. However, in other embodiments, the puck 310 may have a larger cavity that surrounds the pin 320. For example, a solid enclosure (that is puck shaped) may have an air-filled cavity that surrounds the pin 320. Using air as the dielectric material may be useful for modifying the dielectric constant of the DRA 300 in order to provide desired performance metrics in some embodiments.

Figure 4:
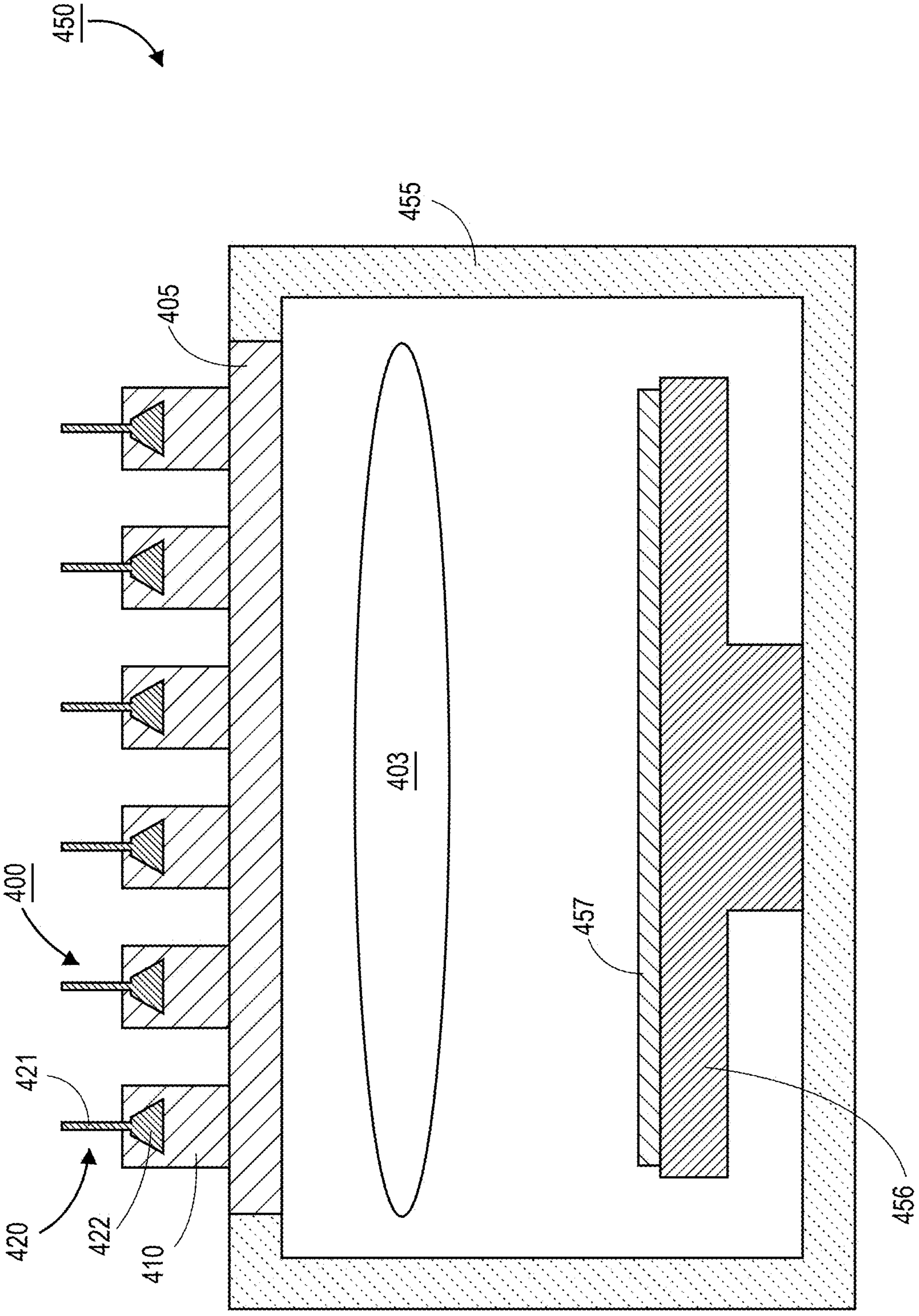
FIG. 4 is a cross-sectional illustration of a microwave plasma processing tool that comprises a plurality of microwave DRAs that comprise a pin with a tapered end, in accordance with an embodiment.

As noted above, the dielectric pucks of the microwave DRAs may have a hole with an opening at the top surface that is too small to accommodate the wider end of the pin. In such embodiments, the dielectric puck may be split into two or more segments. The segments may then be pressed together around the pin. In such an embodiment, the dielectric puck may comprise a seam or interface between the two halves that extends from a bottom of the dielectric puck to a top of the dielectric puck. Referring now to FIG. 4, a cross-sectional illustration of a plasma processing tool 450 is shown, in accordance with an embodiment. In an embodiment, the plasma processing tool 450 may comprise a chamber 455 suitable for supporting a vacuum. In an embodiment, a pedestal 456 may be provided within the chamber 455. The pedestal 456 may include a chuck for securing and supporting a substrate 457, such as a semiconductor wafer or the like. The chamber 455 may be used to process the substrate 457 with a plasma 403. For example, the processing may include etching, deposition, plasma treatment, and/or the like. In an embodiment, a lid 405 of the chamber 455 may comprise a dielectric plate.

In an embodiment, a plurality of microwave DRAs 400 may be provided across a surface of the lid 405. In an embodiment, the microwave DRAs 400 may be similar to any of the microwave DRAs described in greater detail herein. For example, the microwave DRAs 400 may comprise a dielectric puck 410 with a pin 420 inserted into the dielectric puck 410. The pin 420 may comprise a first portion 421 and a second portion 422 with a width that is greater than a width of the first portion. In an embodiment, the pin 420 and the dielectric puck 410 may be configured to provide a long circular waveguide region and emit broadband microwave radiation. The plurality of microwave DRAs 400 may each be electrically coupled to a CIT and a microwave power amplifier (both not shown).

Figure 5:
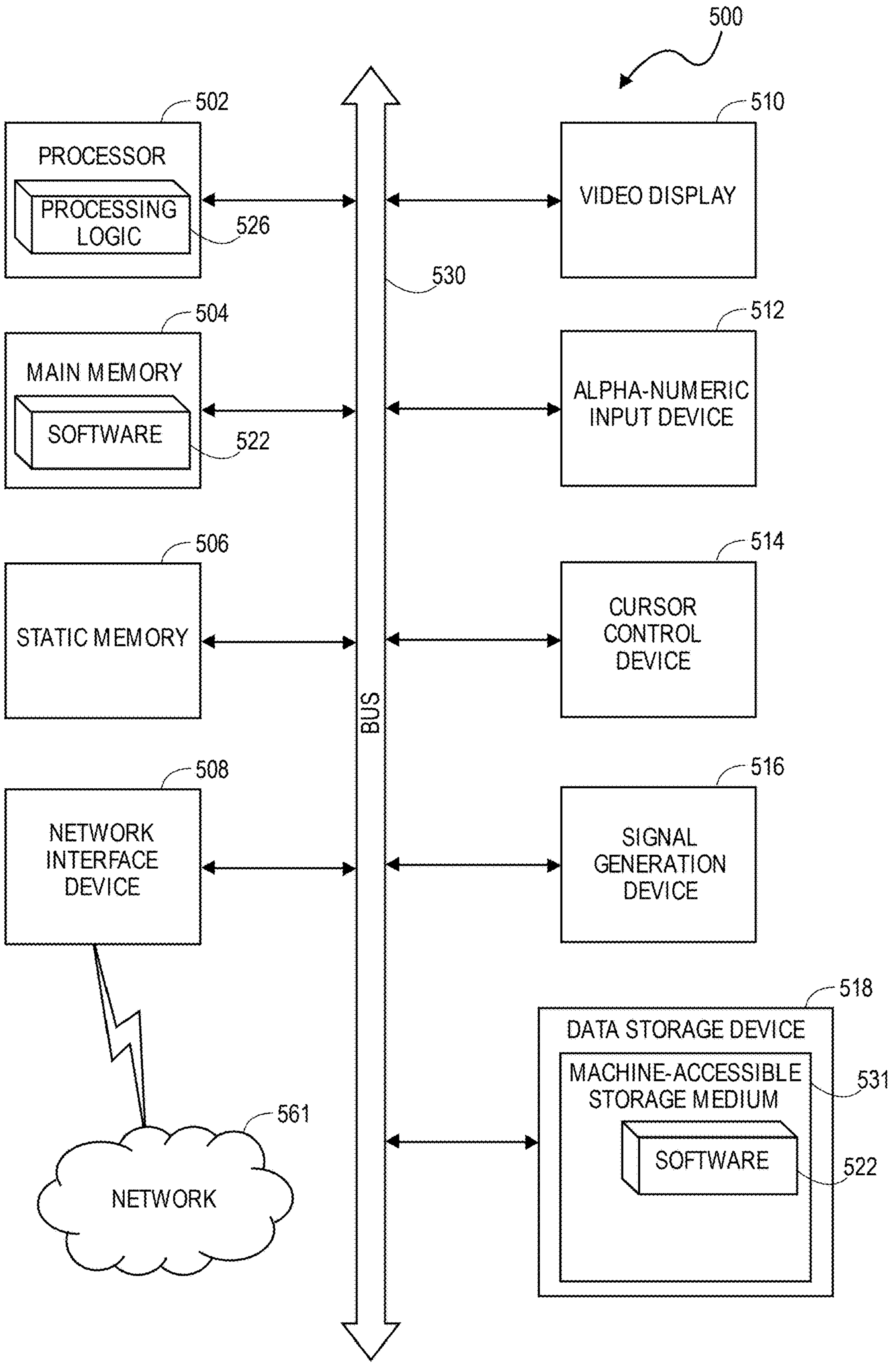
FIG. 5 illustrates a block diagram of an exemplary computer system of a processing tool, in accordance with an embodiment of the present disclosure.

Referring now to FIG. 5, a block diagram of an exemplary computer system 500 of a processing tool is illustrated in accordance with an embodiment. In an embodiment, computer system 500 is coupled to and controls processing in a microwave plasma chamber that comprises a microwave DRA with an optimized circular waveguide region and a pin for wideband microwave propagation.

Computer system 500 may be connected (e.g., networked) to other machines in a Local Area Network (LAN), an intranet, an extranet, or the Internet. Computer system 500 may operate in the capacity of a server or a client machine in a client-server network environment, or as a peer machine in a peer-to-peer (or distributed) network environment. Computer system 500 may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated for computer system 500, the term "machine" shall also be taken to include any collection of machines (e.g., computers) that individually or jointly execute a set (or multiple sets) of instructions to perform any one or more of the methodologies described herein.

Computer system 500 may include a computer program product, or software 522, having a non-transitory machine-readable medium having stored thereon instructions, which may be used to program computer system 500 (or other electronic devices) to perform a process according to embodiments. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical or other form of propagated signals (e.g., infrared signals, digital signals, etc.)), etc.

In an embodiment, computer system 500 includes a system processor 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a secondary memory 518 (e.g., a data storage device), which communicate with each other via a bus 530.

System processor 502 represents one or more general-purpose processing devices such as a microsystem processor, central processing unit, or the like. More particularly, the system processor may be a complex instruction set computing (CISC) microsystem processor, reduced instruction set computing (RISC) microsystem processor, very long instruction word (VLIW) microsystem processor, a system processor implementing other instruction sets, or system processors implementing a combination of instruction sets. System processor 502 may also be one or more special-purpose processing devices such as an application specific integrated circuit (ASIC), a field programmable gate array (FPGA), a digital signal system processor (DSP), network system processor, or the like. System processor 502 is configured to execute the processing logic 526 for performing the operations described herein.

The computer system 500 may further include a system network interface device 508 for communicating with other devices or machines. The computer system 500 may also include a video display unit 510 (e.g., a liquid crystal display (LCD), a light emitting diode display (LED), or a cathode ray tube (CRT)), an alphanumeric input device 512 (e.g., a keyboard), a cursor control device 514 (e.g., a mouse), and a signal generation device 516 (e.g., a speaker).

The secondary memory 518 may include a machine-accessible storage medium 531 (or more specifically a computer-readable storage medium) on which is stored one or more sets of instructions (e.g., software 522) embodying any one or more of the methodologies or functions described herein. The software 522 may also reside, completely or at least partially, within the main memory 504 and/or within the system processor 502 during execution thereof by the computer system 500, the main memory 504 and the system processor 502 also constituting machine-readable storage media. The software 522 may further be transmitted or received over a network 561 via the system network interface device 508. In an embodiment, the network interface device 508 may operate using microwave coupling, optical coupling, acoustic coupling, or inductive coupling.

While the machine-accessible storage medium 531 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies. The term "machine-readable storage medium" shall accordingly be taken to include, but not be limited to, solid-state memories, and optical and magnetic media.

Thus, embodiments of the present disclosure include systems that include a microwave plasma chamber that comprises a microwave DRA with an optimized circular waveguide region and a pin for wideband microwave propagation.

The above description of illustrated implementations of embodiments of the disclosure, including what is described in the Abstract, is not intended to be exhaustive or to limit the disclosure to the precise forms disclosed. While specific implementations of, and examples for, the disclosure are described herein for illustrative purposes, various equivalent modifications are possible within the scope of the disclosure, as those skilled in the relevant art will recognize.

These modifications may be made to the disclosure in light of the above detailed description. The terms used in the following claims should not be construed to limit the disclosure to the specific implementations disclosed in the specification and the claims. Rather, the scope of the disclosure is to be determined entirely by the following claims, which are to be construed in accordance with established doctrines of claim interpretation.

What is claimed is:

1. An apparatus, comprising:

a dielectric puck with a height between a first surface and a second surface; and a pin inserted into a hole into the first surface of the dielectric puck, wherein the pin is electrically conductive, wherein the pin is electrically coupled to an impedance transformer, and wherein the pin comprises:

a first portion with a first width; and a second portion with a second width, wherein the second width is greater than the first width.

2. The apparatus of claim 1, wherein the second portion has a cross-sectional shape with tapered sidewalls.

3. The apparatus of claim 2, wherein the pin further comprises a third portion that is separated from the first portion by the second portion, wherein the third portion has a uniform width through an entire length of the third portion.

4. The apparatus of claim 1, wherein the second portion comprises a cross-sectional shape with a non-uniform width through a length of the second portion, wherein the non-uniform width is greatest between a first end and a second end of the second portion.

5. The apparatus of claim 1, wherein the second portion comprises a stepped cross-sectional shape.

6. The apparatus of claim 5, wherein the first surface of the dielectric puck has a stepped profile.

7. The apparatus of claim 1, wherein the first surface of the dielectric puck is tapered.

8. The apparatus of claim 1, further comprising:

a cavity between the second portion of the pin and a bottom of the hole in the dielectric puck.

9. The apparatus of claim 1, wherein the dielectric puck comprises an interface between a first segment and a second segment, wherein the interface extends from the first surface to the second surface.

10. An apparatus, comprising:
a chamber with a lid, wherein the lid comprises a first dielectric material;
a puck on the lid, wherein the puck comprises a second dielectric material;
a conductive layer around the puck; and
a pin inserted into a hole in the puck, wherein the hole has a first width at a surface of the puck, wherein the pin has an end with a second width that is greater than the first width, and wherein a pin depth into the puck is less than half of a height of the puck.

11. An apparatus, comprising:
a plate, wherein the plate comprises a first dielectric material;
a puck over the plate, wherein the puck comprises a second dielectric material;
a hole into the puck, wherein the hole has a first width at a surface of the puck and a second width within the puck, wherein the second width is greater than the first width; and
a pin inserted into the hole, wherein a pin depth is less than half of a height of the puck.

12. The apparatus of claim 11, wherein the hole comprises a first portion with a uniform width that is equal to the first width and a second portion with a non-uniform width, wherein the non-uniform width includes the second width.

13. The apparatus of claim 11, wherein the pin has an end with a third width that is greater than the first width and smaller than the second width.

14. The apparatus of claim 13, wherein the end has a tapered sidewall.

15. The apparatus of claim 13, wherein the end has a stepped profile.

16. The apparatus of claim 13, wherein the end has a tapered sidewall and a vertical sidewall.

17. An apparatus, comprising:
a chamber with a lid, wherein the lid comprises a first dielectric material;
a puck on the lid, wherein the puck comprises a second dielectric material;
a conductive layer around the puck; and
a pin inserted into a hole in the puck, wherein the pin is electrically coupled to an impedance transformer and a microwave power amplifier, and wherein the hole has a first width at a surface of the puck and wherein the pin has an end with a second width that is greater than the first width.

18. The apparatus of claim 17, wherein the end of the pin has a tapered sidewall and/or a stepped profile.

19. The apparatus of claim 17, wherein a pin depth into the puck is less than half of a height of the puck.

20. An apparatus, comprising:
a dielectric puck with a height between a first surface and a second surface; and
a pin inserted into a hole into the first surface of the dielectric puck, wherein the pin is electrically conductive, and wherein the pin comprises:
a first portion with a first width; and
a second portion with a second width, wherein the second width is greater than the first width, and wherein the first surface of the dielectric puck is tapered.

21. An apparatus, comprising:
a dielectric puck with a height between a first surface and a second surface; and
a pin inserted into a hole into the first surface of the dielectric puck, wherein the pin is electrically conductive, and wherein the pin comprises:
a first portion with a first width; and
a second portion with a second width, wherein the second width is greater than the first width, wherein the second portion has a cross-sectional shape with tapered sidewalls, wherein the pin further comprises a third portion that is separated from the first portion by the second portion, and wherein the third portion has a uniform width through an entire length of the third portion.

22. An apparatus, comprising:
a dielectric puck with a height between a first surface and a second surface; and
a pin inserted into a hole into the first surface of the dielectric puck, wherein the pin is electrically conductive, and wherein the pin comprises:
a first portion with a first width; and
a second portion with a second width, wherein the second width is greater than the first width, wherein the second portion comprises a stepped cross-sectional shape, and wherein the first surface of the dielectric puck has a stepped profile.

* * * * *